July 19, 1949. P. GUAY 2,476,292
WORK FEED ATTACHMENT FOR BAND SAWS
Filed Aug. 29, 1945 2 Sheets-Sheet 2

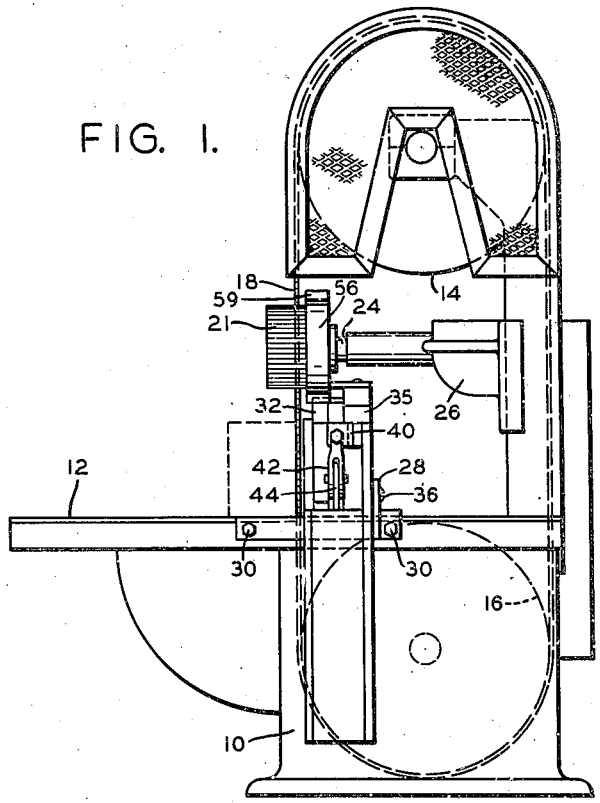

INVENTOR
PHILIAS GUAY
BY Ralph W Chappell
ATTORNEY

Patented July 19, 1949

2,476,292

UNITED STATES PATENT OFFICE 2,476,292

WORK FEED ATTACHMENT FOR BAND SAWS

Philias Guay, Everett, Mass.

Application August 29, 1945, Serial No. 613,411

5 Claims. (Cl. 143—25)

(Granted under the act of March 3, 1883, as amended April 30, 1928; 370 O. G. 757)

This invention relates to a workpiece feeding device and is illustrated herein as embodied in a band resaw of the vertical type.

It is an object of the present invention to provide a workpiece feeding device for use in connection with band saws and the like, which device is effective to facilitate and expedite the positive feeding of workpieces to and past the saw blade in a smooth and efficient manner and with maximum precautions against injury to the operator.

It is another object of the invention to provide a device of this character that is composed of a few, simple and inexpensive parts that are so constructed and arranged as to be readily mounted upon a commercial type of band resaw or on a similar machine.

With the above and other objects and features in view, the invention will now be described with reference to the accompanying drawings which illustrate a preferred embodiment of the invention and will be pointed out in the claims.

In the drawings:

Fig. 1 is a side elevation of a conventional band saw illustrating the present invention applied thereto;

Fig. 2 is a partial front elevation thereof;

Figure 3:
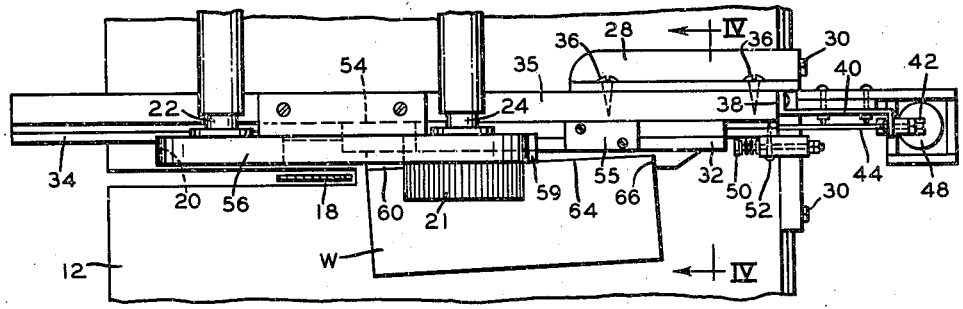
Fig. 3 is a fragmental top plan view of the work table of the saw with the device mounted thereon.

The band saw, in connection with which the device is herein illustrated, comprises the usual base 10, horizontally disposed work table 12 and suitably driven upper and lower wheels 14 and 16, respectively, around which a continuous belt type of saw blade 18 is driven. The saw is equipped with the conventional workpiece feed rolls 20 and 21 that are supported on forwardly extending shafts 22 and 24 suitably journaled in an adjustable bracket 26. The rolls 20 and 21 are arranged to be adjusted heightwise with respect to the table 12 and forwardly and rearwardly with respect to the saw blade 18 by independent and individual adjusting means (not shown) that are customarily provided on these machines.

The saw is also equipped with a conventional upstanding edge guide 28 that is adjustable forwardly and rearwardly of the table 12. The edge guide 28 is arranged to be clamped in adjusted position by screws 30, and, in usual practise the position of the edge guide 28 laterally from the cutting portion of the saw blade 18, determines the width of cut of a workpiece as it is pushed along the table 12 into cutting engagement with the saw blade. In usual practice, the feed rolls 20 and 21 are adjusted heightwise from the table 12 a distance that is just sufficient to cause the outer serrated faces of the rolls to lightly engage the top of the workpiece to assist in feeding it to the blade 18.

The workpiece feeding means of the present invention comprises a horizontally disposed slide or carriage 32 slidably mounted on ways 34 secured to a horizontally disposed member 35 that is, in turn, secured by screws 36 to the edge guide 28. The ways 34 and member 35 extend longitudinally across the full width and slightly beyond the left end of the table 12. The carriage 32, however, is approximately only one half as long as the ways 34 and member 35 and, when it occupies its home or normal position, as shown in Fig. 2, has its left end lying just slightly to the right of the teeth of the saw blade 18.

Figure 6:
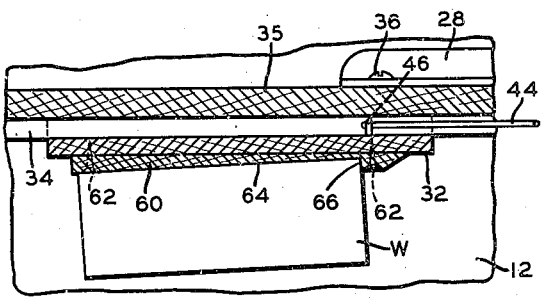
Fig. 6 is a plan view of a portion of the workpiece feeding slide illustrating a workpiece engaged thereby.
Figure 5:
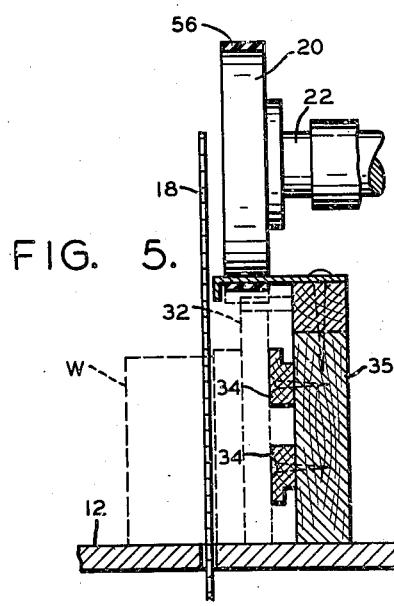
Fig. 5 is a sectional elevation taken on the line V—V of Fig. 2.

Secured to the right end of the member 35, as at 38 (Fig. 3), is an outwardly projecting bracket 40 upon which is supported a pulley 42. A cable or cord 44 passing over the pulley 42 is secured at one end as at 46 (Fig. 6) to the carriage 32. A weight 48 secured to the opposite end of the cord 44 serves to movably hold the carriage 32 in its home or normal position shown in Fig. 2. In this position, the right hand end of the carriage abuts against a yielding spring cushion 50 secured by screws 52 to the right end of the ways 34. The cushion 50 acts as a bumper to receive the impact of the carriage as it restores to this position. Fixed to the top of the carriage 32 are a pair of spaced, upstanding projections or lugs 54 and 55 arranged to cooperate with a driving means now to be described.

The means for driving the carriage 32 leftwardly along the ways 34 on its working stroke, comprises an endless belt 56 that is arranged to be mounted tautly over the spaced, conventional feed rolls 20 and 21. The belt 56 has secured on its outer surface a pair of spurs or cleats 58 and 59 that are spaced apart on the belt a distance that equals the distance of spacing between the lugs 54 and 55.

Figure 4:
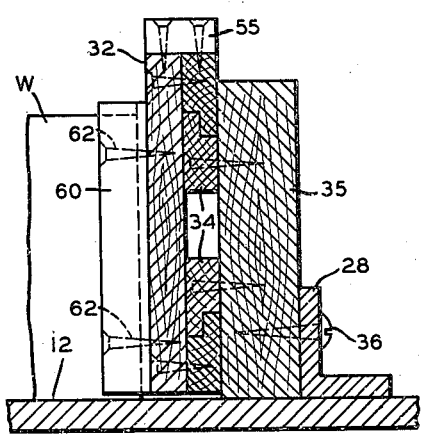
Fig. 4 is a sectional elevation taken along the line IV—IV of Fig. 3.

A workpiece receiving member 60 (Figs. 4 and 6) is secured by screws 62 to the forward face of the carriage 32. This member 60 may take the form herein shown in Fig. 6 and have an angularly disposed recess 64 cut therein with a shoulder 66 adjacent to its right end for engaging the right end of a block or workpiece w. On the other hand, this workpiece engaging member may take the simple form of a cleat secured to the right hand end of the carriage 32. In the former instance, a workpiece w will be held in angular disposition with respect to the saw blade 18 as indicated in Fig. 3. This positioning of a workpiece provides a means for sawing tapered shims or wedges such as are used for various and sundry purposes including shoring, leveling, or bracing work. In the latter instance, i. e., where a straight, simple cleat is used, the inner surface of the workpiece w simply lies flat against the forward face of the carriage 32 and the cutting thereby effected would result in a simple flat piece having straight parallel sides, the thickness, of course, being determined in accordance with the adjustment of the carriage 32 laterally of the saw blade 18 by means of adjusting the edge guide 28.

Figure 7:
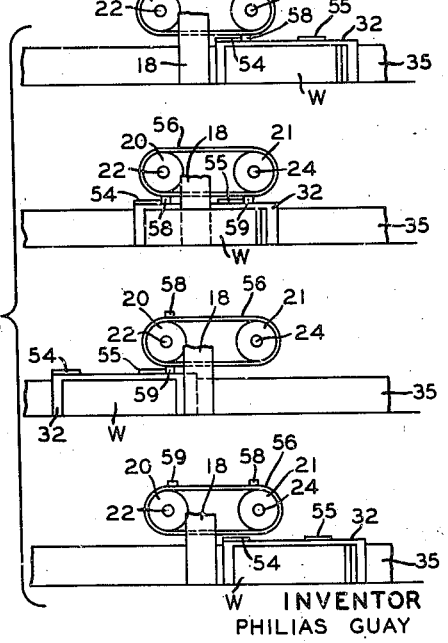
Fig. 7 is a series of diagrammatic views illustrating the progressive steps of movement of the workpiece feed slide.

In operation, the workpiece w is placed in recess 64 against the member 60 with its right end engaged by the shoulder 66 and is held in this position by the operator. Referring now to Figure 7 and observing the progressive illustrations of that figure from top to bottom, it will be seen that when the machine is operating and the belt 56 is rotated by the rolls 20 and 21, the cleat 58 will engage the lug 54 on the carriage. The cleat 58 will move the carriage leftwardly on its working stroke causing advancement of the workpiece w toward the saw blade 18. As the belt 56 continues to rotate the cleat 59 engages the lug 55 and continues to advance the carriage 32 and workpiece w on its working stroke as indicated in the next to the top illustration in Fig. 7. As the carriage and workpiece are further advanced the cleat 58 disengages from the lug 54 but the carriage and workpiece w are continued on their working stroke by the engagement of cleat 59 with lug 55 as indicated in the next to the bottom illustration of Fig. 4, this latter movement being sufficient to carry the workpiece w completely beyond the saw blade 18. Finally, as the cleat 59 becomes disengaged from the lug 55 the carriage 32 is automatically restored to its initial or starting position by the pull exerted by the weight 48 through cord 44. Whilst the carriage is moving rightwardly on its return stroke, the operator moves the remaining portion of the workpiece w, from which a tapered slab has just been cut, manually along the table 12 back into position against the member 60 with its right end engaged by the shoulder 66 ready for the next cutting operation to be performed. The location of the cleats 58 and 59 on the belt 56 and the timing of the rotation thereof about the rolls 20 and 21, is such that ample time is permitted for the operator to effect the aforementioned repositioning of the balance of the workpiece in the recess 64.

From the foregoing it will be observed that by the provision of this device rapid, repeated cuts may be made with very little effort required on the part of the operator and, by the provision of a machine powered work feed mechanism, the operator's hands are left completely free for merely steadying the workpiece in proper position against the holder 64. The operational advances of the device lie not only in its facilitating and expediting production of multiple identical wedges or wood slabs but in the maximum safety afforded the operator by virtue of the fact that at no time during the cutting operation is it required that the hands be in close proximity to the saw blade 18.

The invention described herein may be manufactured and used by or for the Government of the United States of America for governmental purposes without the payment of any royalty thereon or therefor.

Having described my invention what I claim as novel and desire to protect by Letters Patent of the United States is:

1. A device of the character described, comprising a band saw having driven elements, a belt mountable on said elements and driven thereby, a slide constructed and arranged for reciprocatory movement adjacent to said belt, means on said slide for engaging a workpiece, members on said belt engageable with said slide for driving same in one direction to advance a workpiece carried thereby into cutting relation with and past said saw, said members successively disengaging said slide as said belt is driven and said slide is advanced in said one direction, and means connected with said slide for returning it to its initial position upon disengagement of all of said members therefrom.

2. A workpiece feeding device for use with a band saw or the like having spaced driven rolls thereon, said device comprising belt means mountable over said rolls, spaced projections secured on said belt means, a workpiece receiving carriage slidably mounted in proxmity to said belt means, members on said carriage engageable by said projections to drive said carriage in one direction, said projections successively disengaging said members as said belt is driven and said carriage is advanced in said one direction, and means for returning said carriage in an opposite direction upon disengagement of all of said projections from said members.

3. A workpiece feeding device for use with a band saw having spaced driven feeding rolls thereon, said device comprising a slide constructed and arranged for reciprocatory movement on the table of said band saw, a cleat on said slide for engaging a workpiece, spaced lugs on said slide, a belt mounted on said feeding rolls and driven thereby, spaced cleats on said belt engageable with said lugs for driving said slide in one direction to advance a workpiece carried thereby into cutting relation with and past said saw, said spaced cleats successively disengaging said spaced lugs as said belt is driven and said slide is advanced in said one direction, and a weight connected with said slide for returning it to its initial position upon disengagement of all of said cleats from said spaced lugs.

4. An attachment for use with a band saw having spaced driven rolls thereon, said attachment comprising a belt mounted on said driven rolls and driven thereby, spaced cleats secured to said belt, and a workpiece receiving carriage slidably mounted on the table of said band saw in proximity to said belt, lugs on said carriage engageable by said cleats to drive said carriage in one direction a distance equal to the length of said carriage, said lugs and said cleats being so spaced that said cleats successively disengage said lugs as said belt is driven and said distance is traversed by said carriage, and a cable and weight attached to said carriage for returning it in the opposite direction to its initial position upon disengagement of all of said cleats from said spaced lugs.

5. A workpiece feeding device for use with a band saw having spaced driven feeding rolls thereon, said device comprising a slide constructed and arranged for reciprocatory movement on the table of said band saw in proximity to said feeding rolls, first and second spaced lugs secured to said slide, an endless belt mounted on said feeding rolls and driven thereby, first and second cleats secured to said belt and spaced apart a distance equal to the spacing of said lugs, said belt being so arranged with respect to said slide that as said belt is driven, said first cleat first engages said first lug to drive said slide in one direction to advance a workpiece carried thereby into cutting relation with said saw, and as said belt is driven further, said second cleat engages said second lug, both of said cleats then being in driving engagement with their respective lugs, and as said belt is driven still further said first cleat disengages said first lug whereby said slide is driven past said saw by the engagement of only said second cleat with said second lug, and as said belt is driven still further said second cleat disengages said second lug thereby removing the driving force from said slide, and a weight connected with said slide for returning it to its initial position upon the removal of said driving force.

PHILIAS GUAY.

REFERENCES CITED

The following references are of record in the file of this patent:

UNITED STATES PATENTS

| Number | Name | Date |
|---|---|---|
| 187,904 | Putnam | Feb. 27, 1877 |
| 396,935 | Ivey | Jan. 29, 1889 |
| 811,332 | Rufli | Jan. 30, 1906 |
| 877,124 | Robinson et al. | Jan. 21, 1908 |
| 1,463,221 | Mitchell | July 31, 1923 |
| 2,400,667 | Toews | May 21, 1946 |